United States Patent
Greenfield (10) Patent No.: US 11,619,327 B1
(45) Date of Patent: Apr. 4, 2023

(54) DEFORMED BLIND RIVET LOOP CLAMP

(71) Applicant: Elliott Greenfield, Rydal, PA (US)

(72) Inventor: Elliott Greenfield, Rydal, PA (US)

(*) Notice: Subject to any disclaimer, the term of this patent is extended or adjusted under 35 U.S.C. 154(b) by 0 days.

(21) Appl. No.: 17/508,976

(22) Filed: Oct. 23, 2021

(51) Int. Cl.
| | | |
|---|---|---|
| *F16B 37/06* | (2006.01) | |
| *F16L 3/14* | (2006.01) | |
| *F16L 3/137* | (2006.01) | |
| *F16L 3/00* | (2006.01) | |

(52) U.S. Cl.
CPC .............. *F16L 3/14* (2013.01); *F16B 37/065* (2013.01); *F16L 3/00* (2013.01); *F16L 3/137* (2013.01)

(58) Field of Classification Search
CPC ... F16L 3/14; F16L 3/137; F16L 3/233; F16L 3/00; F16B 37/065; F16B 37/067; F16B 37/068; B21J 15/02
USPC ................................. 248/61, 62, 63; 411/183
See application file for complete search history.

(56) References Cited

U.S. PATENT DOCUMENTS

| | | | |
|---|---|---|---|
| 1,025,243 A | | 5/1912 | Carpenter |
| 1,362,244 A | * | 12/1920 | Farley ........................ F16L 3/14 248/62 |
| 1,881,973 A | | 10/1932 | Schmitt |
| 2,149,199 A | | 2/1939 | Waner |
| 3,789,728 A | * | 2/1974 | Shackelford .......... F16B 37/067 411/34 |
| 3,797,358 A | * | 3/1974 | Allender ............... F16B 13/061 411/38 |
| 4,047,683 A | | 9/1977 | Takeuchi |
| 4,869,629 A | | 9/1989 | Witzigman |
| 4,875,815 A | | 10/1989 | Phillips |
| 5,213,378 A | | 5/1993 | MacGregor |
| 5,403,135 A | | 4/1995 | Renner |
| 5,667,328 A | | 9/1997 | Hofle |
| 6,282,756 B1 | * | 9/2001 | van Walraven ....... F16L 55/035 24/19 |
| 6,538,894 B1 | | 3/2003 | Treiber |

(Continued)

FOREIGN PATENT DOCUMENTS

| | | |
|---|---|---|
| DE | 19808685 A1 | 9/1999 |
| EP | 1918596 B1 | 3/2012 |

(Continued)

OTHER PUBLICATIONS

U.S. Appl. No. 16/792,257, filed Feb. 16, 2020, Greenfield.

*Primary Examiner* — Nkeisha Smith (57) ABSTRACT

A suspension loop clamp consisting of a blind rivet nut, a metal strip, and a fastener. The blind rivet nut is inserted into the flat strip through a circular hole in the strip. The blind rivet is then plastically deformed by compression axially applied to both ends of the blind rivet nut from an unset condition to a set condition forming a radially outwardly protruding bulge, which serves to bind the blind rivet nut element to the strip. The blind rivet nut bulge and the loop clamp it is attached to are then additionally dented and thus deformed in a radial pattern so as to be zigzag in shape when viewed through a cross section. This stiffens the protruding bulge so as to restrict the blind rivet nut from reverting back to its original shape when a tensile load is applied opposite to the flange of the rivet nut. The strip of sheet metal is then formed longitudinally into a loop clamp which has bends with holes, at each end, through which a fastener is inserted to clamp the loop around a conduit.

1 Claim, 7 Drawing Sheets

(56) References Cited

U.S. PATENT DOCUMENTS

| | | | |
|---|---|---|---|
| 6,761,520 B1 * | 7/2004 | Dise | F16B 37/067 411/113 |
| 6,779,762 B2 * | 8/2004 | Shibuya | F16L 3/11 248/62 |
| 6,893,196 B2 | 5/2005 | Wille | |
| 7,559,512 B1 * | 7/2009 | diGirolamo | F16L 3/14 248/62 |
| 7,901,171 B2 | 3/2011 | Schruff | |
| 9,897,129 B2 * | 2/2018 | Fahy | F16B 37/065 |
| 2004/0247412 A1 * | 12/2004 | Reck | F16B 19/083 411/386 |
| 2015/0219142 A1 * | 8/2015 | Weatherl | F16B 39/24 29/433 |
| 2015/0369274 A1 | 12/2015 | Stojkovic | |
| 2021/0254650 A1 * | 8/2021 | Greenfield | F16B 37/065 |

FOREIGN PATENT DOCUMENTS

| | | | |
|---|---|---|---|
| FR | 2792270 A1 | 10/2000 | |
| JP | 2004160486 A | 1/2004 | |

\* cited by examiner

PRIOR ART

SECTION I-I

SECTION II-II

DEFORMED BLIND RIVET LOOP CLAMP

CROSS-REFERENCE TO RELATED APPLICATIONS

This is a Continuation in Part of application Ser. No. 16/792,257 filed 16 Feb. 2020 and now abandoned.

DESCRIPTION OF THE PRIOR ART

Figure 1:
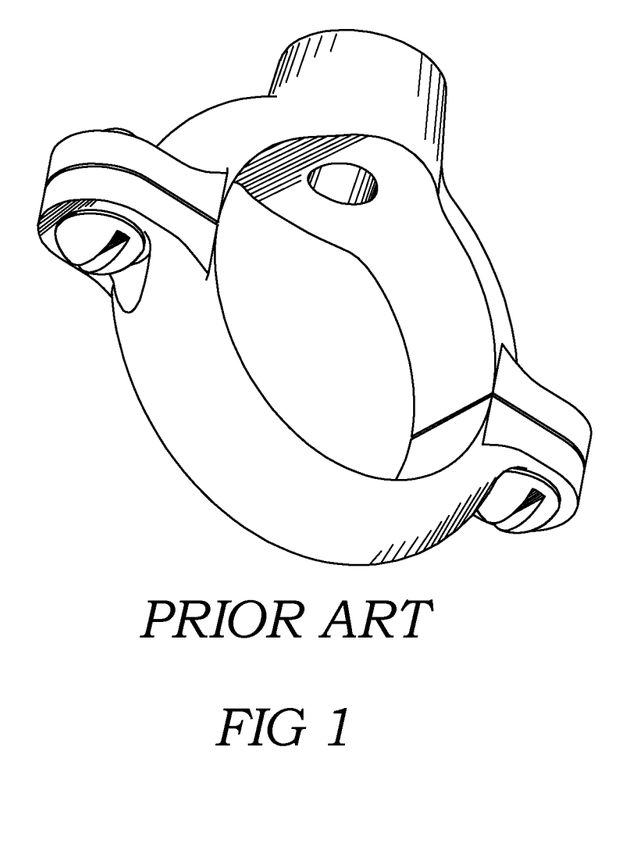
FIG. 1 is prior art known as a common split ring hanger.

Ring hangers for tubular sections as shown in FIG. 1 have long been made in various styles from castings or forgings. The blind rivet nut FIG. 6 referred to here is identical to the unit patented by Waner U.S. Pat. No. 2,149,199 in 1939. Later in 1993 MacGregor U.S. Pat. No. 5,213,378 added an extension to the flanged end of the rivet nut to use as a gas or fluid passageway. In 2004 Morishima of Japan JP-20044160486-A filed an application for a modified nose piece for a typical blind rivet applicator tool. Morishima showed in his drawings a nosepiece applied on a pipe. The inside of the pipe slightly distorts the bulge of the rivet nut. The distortion follows the interior of the pipe so it is minor and not distinct enough to add any structure to the bulged portion. Morishima claims none. Morishima had no intention to do so as the blind rivet nut was being applied in its usual application to be stressed pulling out of the pipe and his design was to shape the flange to the outer surface of the curved pipe.

None of the references presented here use the blind rivet nut in reverse direction nor do any of them indent the bulge to form a zigzag as a secondary operation to structurally stiffen the bulge portion to make it suitable to be used in reverse of its original intent. None of the prior art presented combines the blind rivet nut with a loop clamp for use as a suspension hanger.

FIELD OF THE INVENTION

The loop hanger presented here is for use in building construction for both electrical and plumbing applications to support various conduits typically from threaded rods.

SUMMARY OF THE INVENTION

This loop hanger is of the single support rod type which firmly and securely supports a conduit and makes use of blind rivet nuts to act as the threaded member of the hanger. The blind rivet nut is attached to a loop clamp also known as a round clamp. The embodiment presented here is a new and novel way to secure a blind rivet nut to a loop clamp. Mounting a blind rivet nut in reverse of its originally intended configuration leads to failure of the connection under tensile loading. This design presents a new method of firmly attaching the blind rivet nut to prevent its failure under tensile loading conditions. It is accomplished by recompressing the initial bulge formed when the blind rivet nut is first attached. During this second compression the bulge is deformed into a zigzag pattern as viewed radially. This deformation greatly enhances the stiffness of the bulge. In the eighty years since the blind rivet nut has been invented there are no records of it being used in reverse by stiffening its bulge with a secondary operation. Blind rivet nuts are used where access to the back side of the rivet is impossible, hence its name "blind rivet nut". The use of the blind rivet nut enables a ring hanger design without the need for a welded the assembly. It also allows for a lighter structure in the hanger while still meeting the standard load requirements.

DETAILED DESCRIPTION OF THE INVENTION

Figure 6:
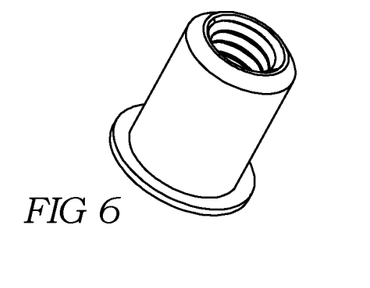
FIG. 6 is an isometric view of a blind rivet nut.

This invention uses a blind rivet nut as shown in FIG. 6 as the threaded element of a suspension loop clamp used to support a conduit. This loop clamp consists of a blind rivet nut, a perforated strip of flat metal, and a fastener.

Figure 3:
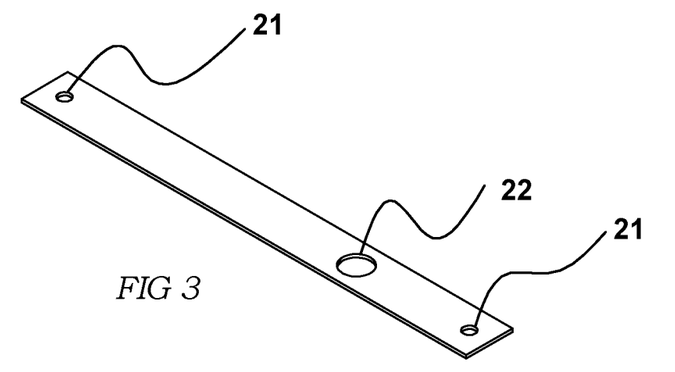
FIG. 3 is the flat strip with holes in it.
Figure 4:
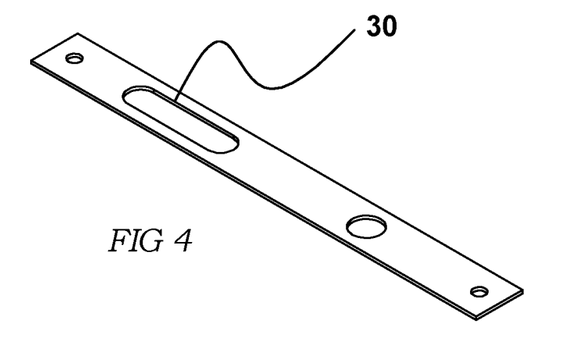
FIG. 4 is the flat strip with holes and optional slot.
Figure 5:
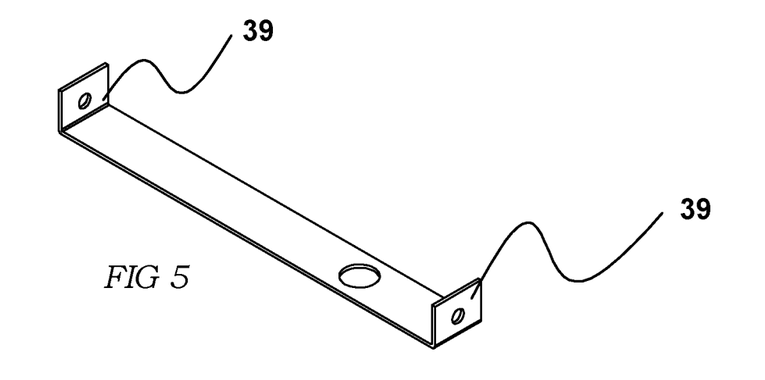
FIG. 5 is the flat strip with ends bent up.
Figures 7, 8:
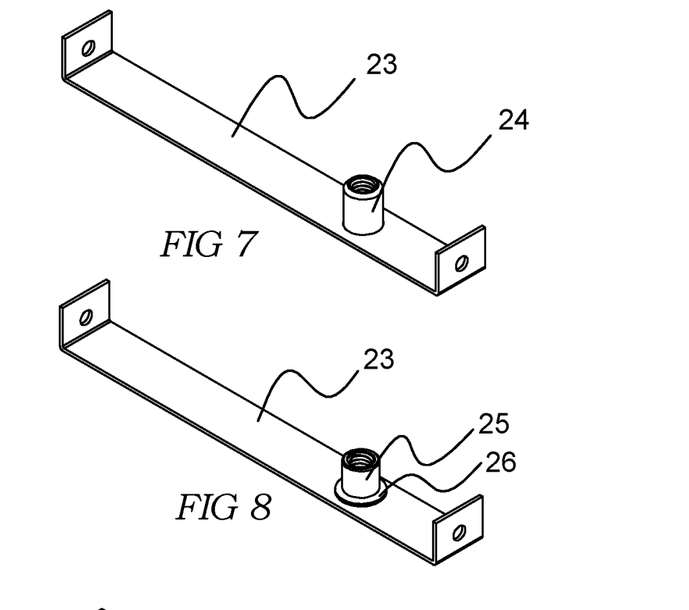
FIG. 7 is the flat strip with blind rivet nut inserted but not compressed.
FIG. 8 is the assembly from FIG. 7 after the first compression with the resulting bulge in the blind rivet nut but with no distortion.
Figure 9:
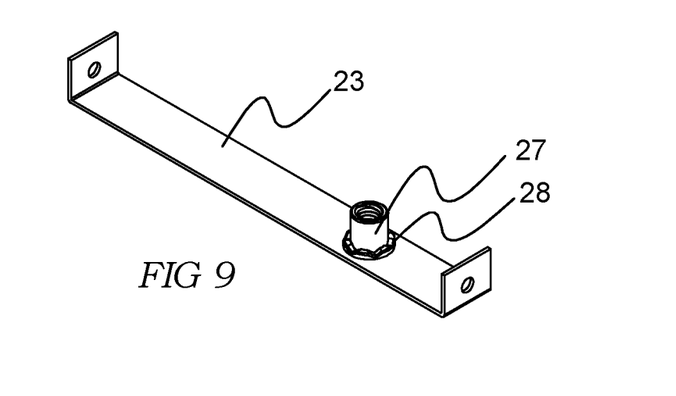
FIG. 9 is the assembly from FIG. 7 after the second compression with the zigzag distorted bulge.

The loop clamp is fabricated by cutting a flat strip of metal, see FIG. 3, to the appropriate length and then piercing a hole 21 through each end with an appropriate punching tool sized suitably for the fastener and thereafter punching a third hole 22 between the other two holes. This third hole being large enough to received the blind rivet nut. As is shown in FIG. 4, the strip may also have a slot 30 in it to enable it to be more easily bent. As shown in FIG. 5 the strip then has its end sections 39 bent up mostly perpendicular. As shown in FIG. 7 The blind rivet nut 24 is then inserted into the larger hole from the opposite side of the strip to the bent up ends. As shown in FIG. 8 the blind rivet nut is then compressed using a punch press or another suitable compression equipment, between two cylindrical pins aligned axially to form a bulge, or bead 26 in the blind rivet nut. The bulge appears on the outside of the loop, and binds the blind rivet nut to the strip 23. The bulge, thus formed, could be pulled out back to its original shape under certain tensile loads. This assembly requires the blind rivet nut to be further deformed into a zigzag shaped bulge 28 shown in FIG. 9 by a second compression tool. This second cylindrical compression tool is larger in its inside diameter than the body of the blind rivet nut containing the thread.

Figure 11:
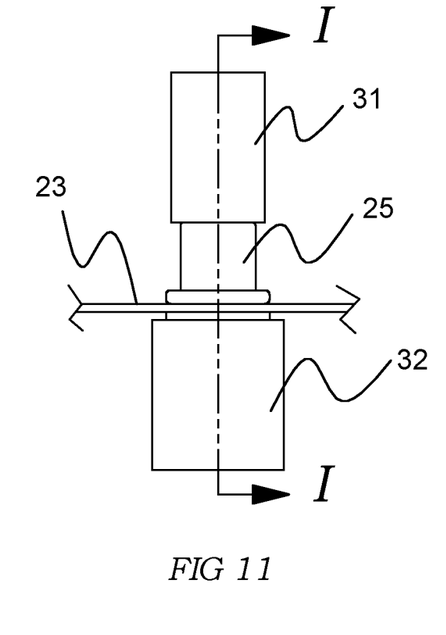
FIG. 11 is the arraignment and engagement of first compression tools and section line.
Figure 12:
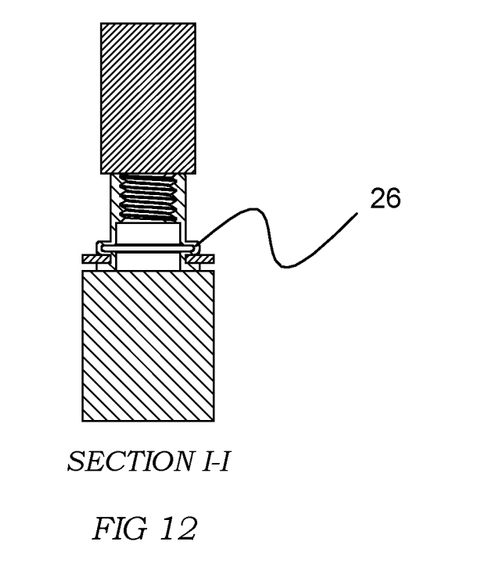
FIG. 12 is a section view showing first flattening tool compression creating the bulge.

FIG. 11 shows the arrangement of the tooling required for the first deformation. The first cylindrical compression tool 31 is forced towards the supported cylindrical anvil 32 compressing the blind rivet nut 25. The compression is accomplished in a standard mechanical press or a hydraulic press. This forces a circular bulge 26 to form in the blind rivet nut, fixing the blind rivet nut to the bent strip 23. FIG. 12 shows the same parts in section showing the bulge 26 formed on the strip 23.

Figure 10:
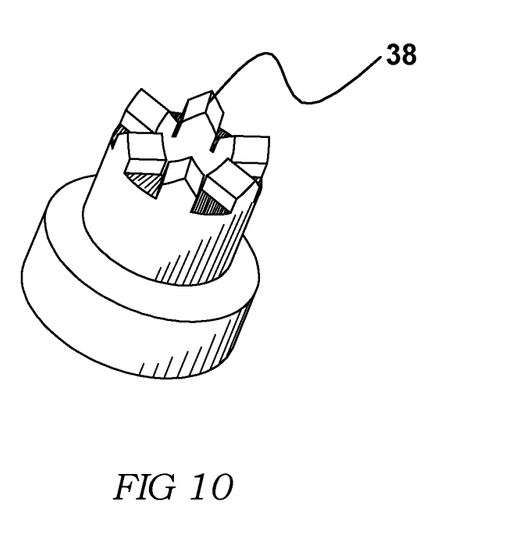
FIG. 10 is a shaped compression zigzag tool in an isometric view. It is a six edge version.

The second cylindrical form tool, see FIG. 10, indents the bulge radially into a zigzag shape using wedge shaped edges 38. No pressure is applied to the central part of the rivet nut as its threads would distort under any further compression.

Figure 13:
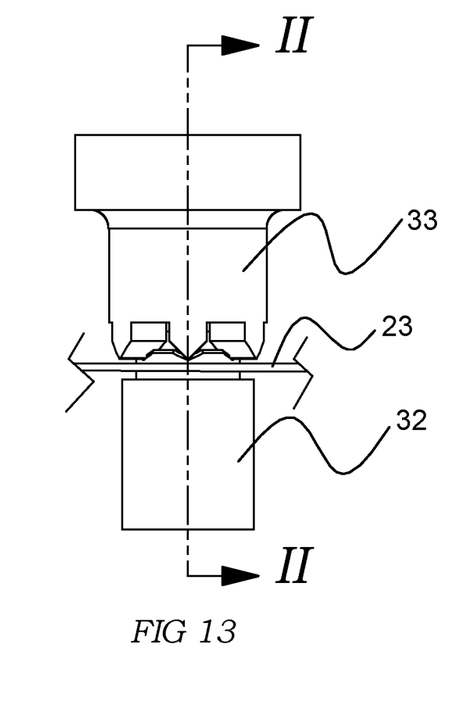
FIG. 13 is the arraignment and engagement of the second zigzag shaped compression tool and section line.
Figure 14:
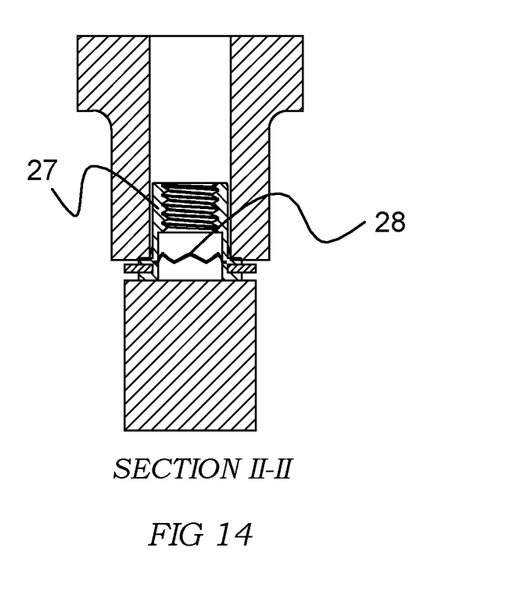
FIG. 14 is a section view showing second compression with the zigzag tool.

The second compression tool arrangement, as shown in FIG. 13, form the zigzag into the bulged part of the blind rivet nut. The zigzag tool 33 applies a force to the blind rivet nut bulge impressing a zigzag pattern radially on to the bulge, steel strip and the flange of the blind rivet nut. The compression is accomplished into the anvil 32, again using a standard mechanical press or a hydraulic press. FIG. 14 is a sectional view of the tool showing the bulge of the blind rivet nut 27 and the resulting zigzag deformation of the bulge 28.

Figure 15:
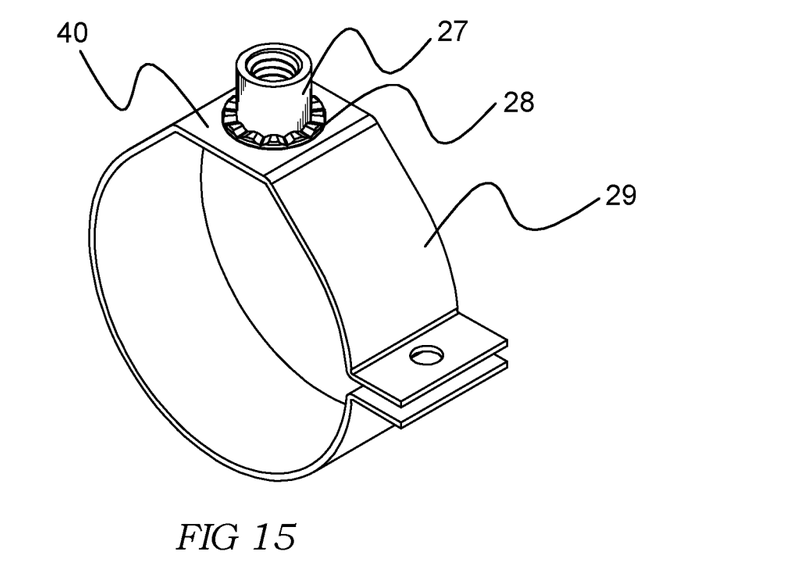
FIG. 15 is the assembly bent into a loop.

The strip is then formed longitudinally into a mostly cylindrical shape shown in FIG. 15 except a flattened area 40 where the blind rivet nut has been inserted. FIG. 15 further shows the blind rivet nut 27 with its deformed bulge 28 on the formed loop 29.

Figure 2:
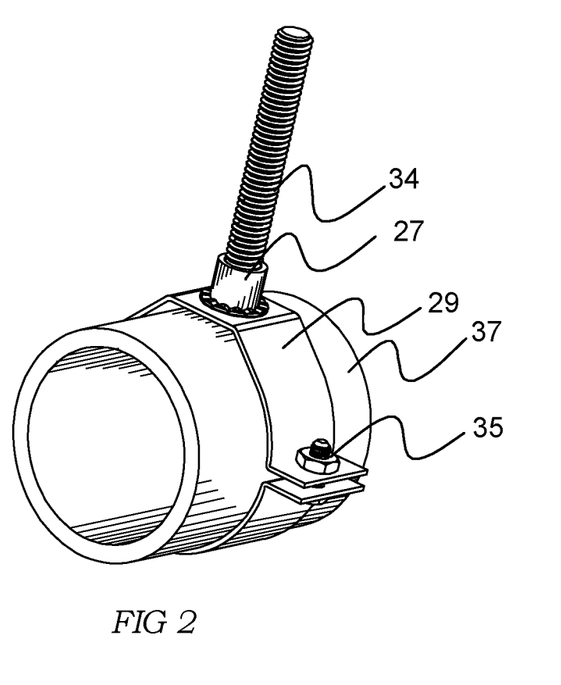
FIG. 2 shows a final assembly with supported conduit, deformed blind rivet loop clamp, using nut and bolt fastener and all being supported by an all thread rod.
Figure 16:
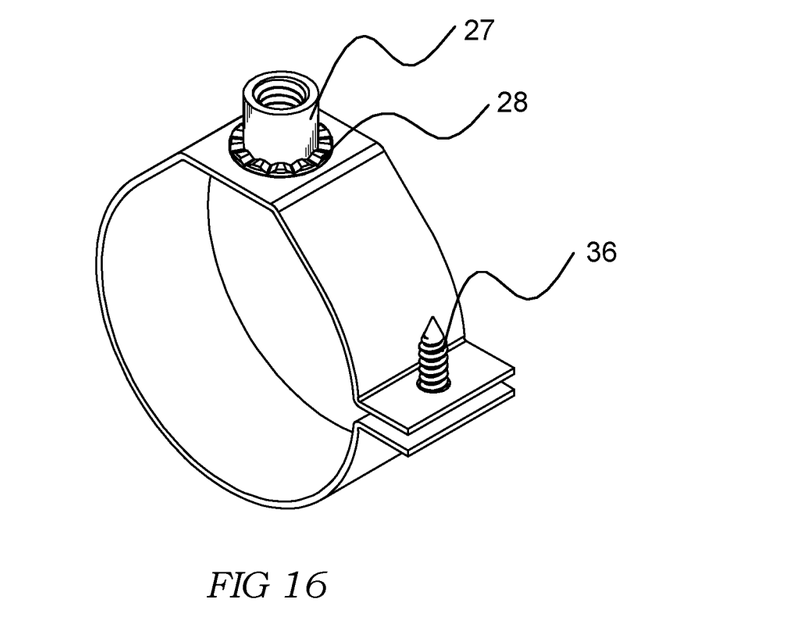
FIG. 16 is the assembly bent into a loop with its fastener added. Here the fastener is a sheet metal screw.

In FIG. 16 a sheet metal screw fastener 36 is shown placed into the end holes of the loop to secure them together forming a loop clamp. A fastener as described here may refer to a nut and machine screw fastener 35 as shown in FIG. 2, a sheet metal screw 36 as shown in FIG. 16, or any other suitable fastener. Another embodiment of the loop clamp has a slot 30 in the strip to reduce the bending force required to wrap or unwrap the strip around a conduit and is shown in FIG. 4. To use the deformed blind rivet loop clamp, a threaded rod 34, shown in FIG. 2, is attached to a structure and is threaded into the deformed blind rivet nut 27. The machine screw fastener 35 of the loop 29 is then tightened around a conduit 37.

ITEMS IN THE DRAWINGS

21. Small apertures in flat strip for fastener.
22. Additional larger aperture in flat strip for blind rivet nut.
23. Flat strip with ends bent up
24. Rivet nut
25. Rivet nut bulged
26. Bulge in the rivet nut
27. Rivet nut zigzag deformed
28. Zigzag shape in rivet nut
29. Loop as formed.
30. The slot in the strip.
31. First compression top tool
32. Fixed anvil of compression tool
33. Zigzag shaped compression tool used in second compression
34. Threaded rod attachment
35. Bolt and nut as fastener
36. Sheet metal screw as fastener
37. Pipe or conduit.
38. Wedge shaped edges in tool used to form zigzag.
39. Ends bent up for fasteners.
40. Flattened section of loop

CONCLUSION, RAMIFICATIONS, AND SCOPE

The embodiment presented here enables a common blind rivet nut to be used as the threaded component in a suspension loop clamp. This is a new and novel use. This product replaces iron castings which often create air pollution during their manufacture. The loop clamp presented here enables pre-plated, or paint coated stock to be used for the loop clamp as no welding is required for the assembly. The blind rivet nuts are a standard commercial plated product and as such available at low cost. By not having to do secondary post processes to the assembled product, the item may be packaged directly off an automated manufacturing assembly line eliminating the added costs of handling and transport.

The invention claimed is:

1. A suspension loop clamp for supporting a conduit, comprising:
   a. a axially collapsed blind rivet nut element with a radial zigzaggy deformation of collapsed section of said blind rivet nut,
   b. a fastener element and
   c. a longilateral metal strip element shaped into a cylindrical loop with apertures at each end, bent up to receive said fastener, where said longilateral metal strip element having one additional aperture through which said blind rivet nut element has been disposed outwardly.

* * * * *